United States Patent [19]

Kiyonaga

[11] Patent Number: 5,055,948
[45] Date of Patent: Oct. 8, 1991

[54] MAGNETIC TAPE USING TWO END POSITION IDENTIFYING PARTS AND A DATA RECORDING METHOD AND APPARATUS USING THE MAGNETIC TAPE

[75] Inventor: Chitoku Kiyonaga, Higashi-Hiroshima, Japan

[73] Assignee: Sharp Kabushiki Kaisha, Osaka, Japan

[21] Appl. No.: 430,154

[22] Filed: Nov. 1, 1989

[30] Foreign Application Priority Data

Nov. 2, 1988 [JP] Japan .................................. 63-278188

[51] Int. Cl.$^5$ ............................................. G11B 15/02
[52] U.S. Cl. ...................................... 360/69; 360/72.1
[58] Field of Search ................. 360/69, 71, 72.1, 74.6; 242/188

[56] References Cited

U.S. PATENT DOCUMENTS

| 3,566,132 | 2/1971 | Walker | 360/74.6 X |
| 4,615,682 | 10/1986 | Salvo | 360/74.6 X |
| 4,750,052 | 6/1988 | Poppy et al. | 360/69 X |
| 4,848,698 | 7/1989 | Newell | 360/74.6 X |
| 4,863,114 | 9/1989 | Moeller et al. | 242/188 |

FOREIGN PATENT DOCUMENTS 52-40106 3/1977 Japan .................................. 360/74.6

OTHER PUBLICATIONS

IBM/TDB vol. 12, No. 12, May 1970, "Optimized Tape-Mark Detector" by Roberts.

Primary Examiner—John H. Wolff

[57] ABSTRACT

A magentic tape, a second end identifying part at a predefined distance from the end position of the magnetic tape in a direction toward the beginning of the tape. This second end identifying part is separate from an existing first end identifying part. When data is recorded on such a magnetic tape, the second end identifying part is first detected by an end detecting device, and then the residual data stored in a memory before the second end identifying part is detected are recorded in a recording area located between the second end identifying part and the first end identifying part. This makes it possible to record all data left within the memory before reaching the first end identifying part, that is, before the recording areas of the magnetic tape become full.

2 Claims, 2 Drawing Sheets

MAGNETIC TAPE USING TWO END POSITION IDENTIFYING PARTS AND A DATA RECORDING METHOD AND APPARATUS USING THE MAGNETIC TAPE

BACKGROUND OF THE PRESENT INVENTION

1. Field of the Present Invention

The present invention relates to a magnetic tape, a data recording method and a data recording apparatus using the magnetic tape.

2. Description of the Prior Art

A digital audio tape recorder (DAT) of rotary head type is used not only as a recording and reproducing apparatus of audio signals for its primary purpose, but also, for example, as an external storage for a host computer.

A magnetic tape used in a digital audio tape recorder has an end indentifying part consisting of transparent and non-magnetic material at an end position of the magnetic tape. The digital audio tape recorder records sequentially data sent from the host computer onto the magnetic tape, and when the end identifying part has been detected by, for example, a photo-interrupter, the digital audio tape recorder sends a signal notifying that the end position has been detected to the host computer. When receiving the signal, the host computer performs such a process as terminating the sending of data.

The digital audio tape recorder used as an external storage for a host computer in this way has a built-in buffer memory consisting of a large amount of semiconductor memory. Data sent from the host computer is temporarily stored in this buffer memory and data outputted from this buffer memory is recorded on the magnetic tape. Therefore, when the end position of the magnetic tape has been detected as abovementioned, a large amount of data may remain in the buffer memory even though the magnetic tape has already little area left to be recorded on. In such a case, the data in the buffer memory cannot be recorded on the magnetic tape and the data left in the buffer memory has to be sent back to the host computer. This results in increasing the work load of the host computer.

SUMMARY OF THE PRESENT INVENTION

An object of the present invention is to provide a magnetic tape, a data recording method using the magnetic tape, and a data recording apparatus using the magnetic tape to improve the working efficiency of recording operation in the neighborhood of the end position of the magnetic tape when recording data on the magnetic tape.

The present invention presents a magnetic tape having the first end identifying part at the end position of the magnetic tape and the second end identifying part at a predefined distance from that end position toward the beginning of the magnetic tape.

The present invention is directed to a data recording method comprising the steps of:

preparing a magnetic tape to have the first end identifying part at the end position of the magnetic tape and the second end identifying part at a predefined distance from that end position toward the beginning of the magnetic tape, and of the recording apparatus having a recording means for recording data on the magnetic tape, the end detecting means for detecting the first end identifying part and the second end identifying part and is positioned at a distance from the recording means along in the running direction of the magnetic tape, and the memory for storing data to be recorded on the magnetic tape, recording end identifying data at least on the beginning side of the second end identifying part when an end detecting means detects the second end identifying part in recording data on the magnetic tape with a recording apparatus, and recording the residual data stored in the memory other than data recorded on the magnetic tape before detecting the second end identifying part between the second end identifying part and the first end identifying part.

Furthermore the present invention is directed to a data recording apparatus comprising:

a magnetic tape having the first end identifying part at an end position of the magnetic tape and the second end identifying part at a predefined distance position toward the beginning of the magnetic tape, recording means for recording data on the magnetic tape, end detecting means for detecting the first end identifying part and the second end identifying part, and is positioned at a distance forward of the recording means with respect to a running direction of the magnetic tape, a memory, having a capacity of memory equal to or less than a memory capacity for a recording area between the first end identifying part and the second end identifying part, for storing data to be recorded on the magnetic tape, and control means, in response to output from the end detecting means for recording end identifying data a forward side of the second end identifying part when detecting the second end identifying part and for recording the residual data stored in the memory before detecting the second end identifying part in the recording area between the second end identifying part and the first end identifying part.

A magnetic tape used in the present invention is provided with the second end identifying part at a predefined distance from the end position of the magnetic tape toward the beginning position of the tape. The second end identifying part is separate from the first end identifying part. When recording data on such a magnetic tape as this with a recording apparatus, the second end identifying part is first detected by end detecting means and the residual data stored in the memory before detection of the second end identifying part is recorded between the second and first end identifying parts. This makes it possible to record all data stored in the memory before reaching the first identifying part and to improve the working efficiency of recording.

Thus, according to the present invention, setting the second end identifying part at a greater distance from the end of the magnetic tape than the first end identifying part to detect earlier the whereabouts of the end of a magnetic tape results in improving a working efficiency of recording operation in the neighborhood around the end of the magnetic tape.

BRIEF DESCRIPTION OF THE DRAWINGS

These objects, other objects, features and merits of the present invention will be clarified by the following detailed descriptions and drawings wherein.

DETAILED DESCRIPTION OF THE PREFERRED EMBODIMENT

Figure 1:
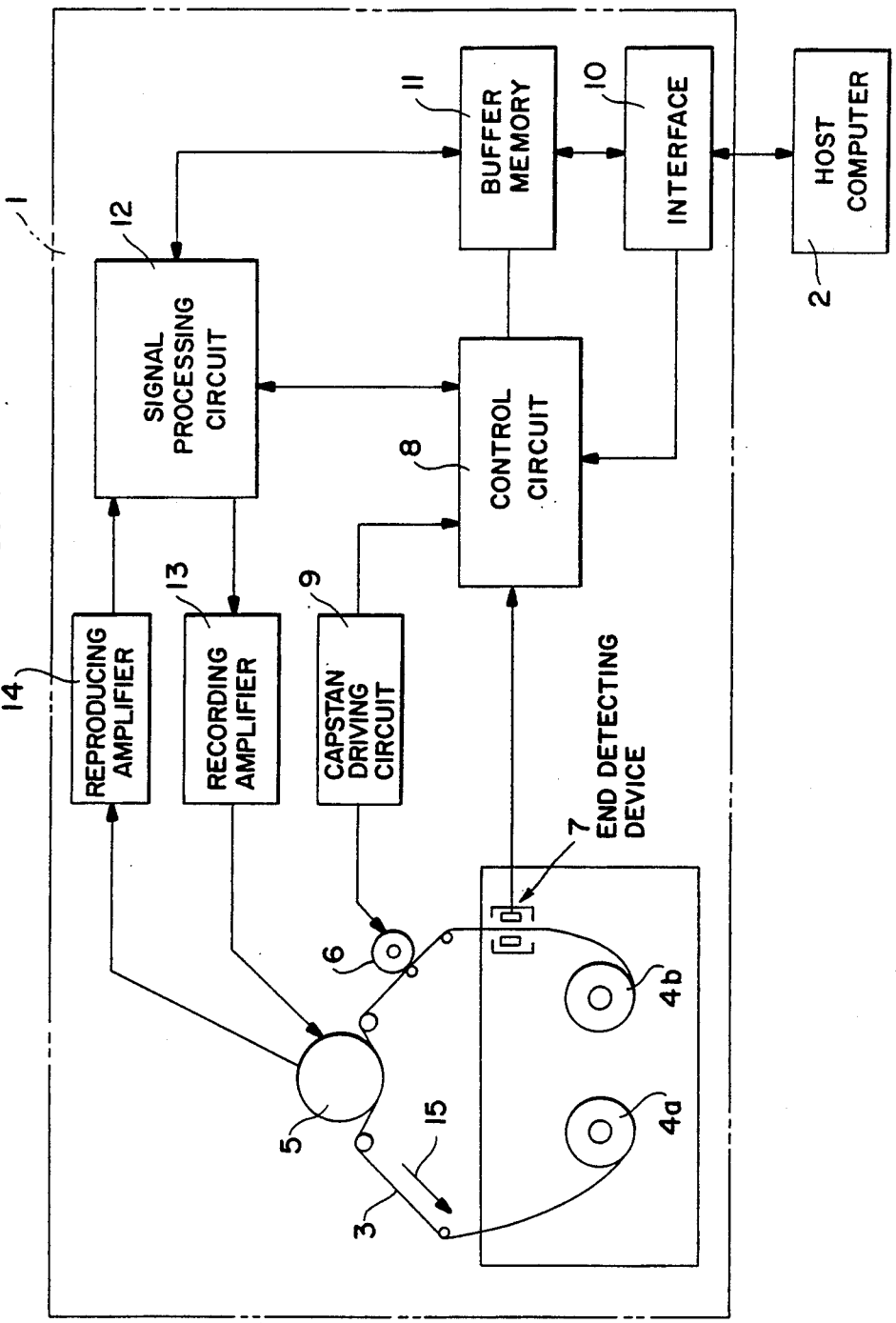
FIG. 1 is a block diagram showing an electrical composition of an embodiment of the present invention.

Referring to the drawings, a preferred embodiment of the present invention is described in details below.

FIG. 1 is a block diagram showing an electrical composition of a digital audio tape recorder 1 and a host computer 2 which are used in an embodiment of the present invention.

A magnetic tape 3 is fixed on a winding reel 4a at the beginning part of the tape, while it is fixed on a feeding reel 4b at the end of the tape. At the time of recording and reproducing operations, the magnetic tape 3 is wound from the feeding reel 4b to the winding reel 4a. A middle part of the magnetic tape 3 is in contact with a rotary drum head 5, by which data recording/reproducing operations to/from the magnetic tape 3 are performed. And a capstan 6 to drive the magnetic tape 3 and an end detecting device 7 to detect the end identifying parts of the magnetic tape 3 are mounted between the rotary drum head 5 and the feeding reel 4b of the magnetic tape 3. The capstan 6 is driven by a capstan driving circuit 9 connected to a control circuit 8.

Data sent from the host computer 2 is stored temporarily in the buffer memory 11 of semiconductor memory through the interface 10. Data stored in the buffer memory 11 is modulated by a signal processing circuit 12 in order to be recorded on the magnetic tape 3 and is sent to the rotary drum head 5 through a recording amplifier 13. Data reproduced by the rotary drum head 5 from data recorded on the magnetic tape 3 is received by the signal processing circuit 12 through a reproducing amplifier 14 and then is sent to the host computer 2 through the buffer memory 11 and the interface 10. Operations of the buffer memory 11 and the signal processing circuit 12 are controlled by a control circuit 8, respectively. Various command signals from the host computer 2 to the digital audio tape recorder 1 are provided to the control circuit 8 through the interface 10.

Figure 2:
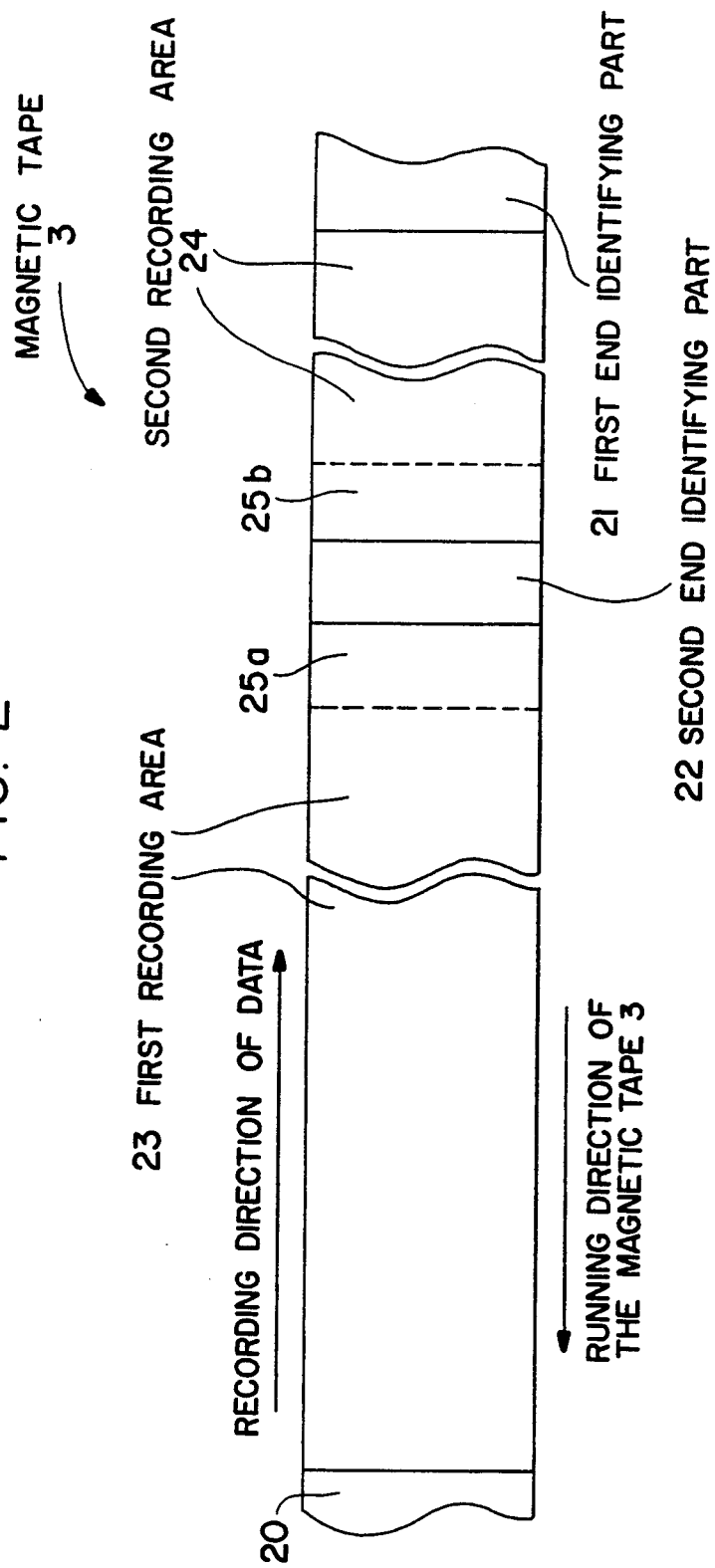
FIG. 2 is a diagram of a magnetic tape 3.

FIG. 2 is a diagram of the magnetic tape 3. The magnetic tape 3 has the beginning part 20 and the first end part 21 made of transparent and non-magnetic material in the neighborhood of its beginning and end edges, respectively. The second end part 22 similarly made of transparent and non-magnetic material is provided at a specified distance from the first end part 21 toward the beginning of the magnetic tape 3. An area between the beginning part 20 and the second end part 22 is defined as the first recording area 23 made of magnetic material, and an area between the second end part 22 and the first end part 21 is defined as the second recording area 24. A distance between the second end part 22 and the first end part 21, that is, the recording capacity for data to be recorded in the second recording area 24 is selected to be a greater than the memory capacity for data stored in the buffer memory 11. And dummy data recording areas 25a and 25b in which dummy data described later, are recorded are provided on both sides of the second end part 22.

Next, a write operation of data sent from the host computer 2 onto the magnetic tape 3 is described below.

When a data record instruction from the host computer 2 is given to the control circuit 8 through the interface 10, the control circuit 8 activates the capstan 6 through the capstan driving circuit 9 to run the magnetic tape 3 in the direction of arrow 15 in FIG. 1. Data to be recorded is stored temporarily in the buffer memory 11 through the interface 10 from the host computer 2. The data stored in the buffer memory 11 is given sequentially to the signal processing circuit 12 on the basis of signals from the control circuit 8 and after being optimally modulated for recording, this data is given to the rotary drum head 5 through the recording amplifier 13 and is recorded on the magnetic tape 3.

In this way, data continues to be recorded sequentially on the magnetic tape 3. When the recording reaches the neighborhood of the end of the magnetic tape 3, an end detecting device 7, for example, a photo-interrupter, detects the second end part 22 and outputs the detection signal to the control circuit 8. Simultaneously. The control circuit 8 sends a signal notifying this detection to the host computer 2 and records dummy data which is an end identifying data in the dummy data recording areas 25a and 25b through the signal processing circuit 12. At this time, the dummy data may be recorded only in the dummy data recording area 25a which is provided on beginning side of the second end part 22.

After this, data left in the buffer memory 11 is recorded in the second recording area 24. And also, data instructed by a record instruction from the host computer 2 is recorded, if any. In this way, all data at least left in the buffer memory 11 can be recorded before appearance of the existing first end part 21. Thus, by removing necessity of such an extra operation such as a reverse transmission of the residual data back to the host computer 2, as described in the paragraph of the prior art, the present invention can improve a working efficiency of recording operation.

On the other hand, when a read instruction is outputted from the host computer 2, the magnetic tape 3 is run in the same way as the recording operation previously described and data reproduced by the rotary drum head 5 is stored temporarily in the buffer memory 11 through the reproducing amplifier 14 and the signal processing circuit 12. The data stored in the buffer memory 11 is sent sequentially to the host computer 2 through the interface 10 by signals from the control circuit 8.

In this way, data continues to be reproduced sequentially, and when the reproducing operation reaches the neighborhood of the end of the magnetic tape 3, the second end part 22 is detected by the end detecting device 7 in the same way as the recording operation previously described. At this time, the dummy data recorded in the dummy data recording areas 25a and 25b, are ignored, and the data recorded in the second recording area 24 following the dummy recording areas are sent to the host computer 2. In this way, ignoring dummy data recorded in the dummy data recording areas 25a and 25b when reproducing in the neighborhood of the second end part 22 makes it possible to avoid a trouble in the reproduction data which may be caused by setting the second end part 22.

Thus, by setting the second end part 22 in addition to the existing first end part 21, the present invention makes it possible to earlier recognize reaching the neighborhood of the tape end in recording data than the prior art, and makes it possible to more efficiently record data before all recording areas become full.

Although in this embodiment of the present invention some dummy data are recorded in the dummy data recording areas 25a and 25b, any data does not have to be recorded in those areas, if the second end part 22 can be identified at the time of reproduction of data.

The present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A data recording method comprising the steps of:
   (a) preparing a magnetic tape with a first end identifying part at an end position of the magnetic tape and a second end identifying part at a predefined distance from the first end identifying part, the second end identifying part being closer to a beginning of the magnetic tape;
   (b) recording data on the magnetic tape;
   (c) detecting the first end identifying part and the second end identifying part;
   (d) storing data in a memory to be recorded on the magnetic tape;
   (e) recording end identifying data in a recording area positioned just before the second end identifying part when said step (c) detects the second end identifying part; and
   (f) recording residual data stored in the memory before detecting the second end identifying part in a recording area between the second end identifying part and the first end identifying part.

2. A data recording apparatus comprising:
   a magnetic tape having the first end identifying part positioned at an end position of said magnetic tape and a second end identifying part positioned at a predefined distance from said first end identifying part in a direction toward a beginning of said magnetic tape;
   recording means for recording data on said magnetic tape;
   end detecting means for detecting said first end identifying part and said second end identifying part; and
   a memory for storing data to be recorded on said magnetic;
   said recording means recording end in a recording area before said second end identifying part when said end detecting means detects said second end identifying part;
   said recording means recording residual data stored in said memory before detecting said second end identifying part in a recording area positioned between said second end identifying part and said first end identifying part.

* * * * *